Dec. 16, 1969

A. W. SHARPE 3,483,729

MOTION RESPONSIVE DISTANCE INDICATING
DEVICE WITH CALIBRATING MEANS

Filed March 24, 1966

INVENTOR
ARCHIBALD W. SHARPE
BY
ATTORNEY

INVENTOR
ARCHIBALD W. SHARPE
BY
ATTORNEY

Dec. 16, 1969   A. W. SHARPE   3,483,729
MOTION RESPONSIVE DISTANCE INDICATING
DEVICE WITH CALIBRATING MEANS
Filed March 24, 1966   3 Sheets-Sheet 3

INVENTOR
ARCHIBALD W. SHARPE
BY
*S. C. Yeaton*
ATTORNEY

United States Patent Office 3,483,729
Patented Dec. 16, 1969

3,483,729
MOTION RESPONSIVE DISTANCE INDICATING DEVICE WITH CALIBRATING MEANS
Archibald Walter Sharpe, Camberley, Surrey, England, assignor, by mesne assignments, to Sperry Rand Limited, London, England, a company of England
Filed Mar. 24, 1966, Ser. No. 538,901
Claims priority, application Great Britain, Apr. 1, 1965, 13,968/65
Int. Cl. G01c 25/00; G01l 25/00; G01w 1/18
U.S. Cl. 73—1
3 Claims

ABSTRACT OF THE DISCLOSURE

Built-in testing means for a distance measuring device of the mechanical double integrating type, including an acceleration-responsive pivoted gear sector drivably connected to a flywheel, is disclosed. The flywheel serves both as an inertial mass and as the rotor of an electric motor for use in testing the device. When a standards test pulse is applied to the motor, switchs are successively actuated and the time interval for actuation of all the switches is compared to a standards time (representative of a predetermined distance) to decide whether the device is operating within prescribed tolerances.

This invention relates to a device sensitive to distance moved by the device. It is based on the mechanical double-integrating principle illustrated diagrammatically in FIGURE 1 of the accompanying drawings. A geared sector 11 pivoted at 12 meshes with a gear train 13 connected the drive flywheel 14. When the device is accelerated in the direction of arrow A the sector 11 experiences an inertial force tending to rotate it about its pivot 12 in the opposite sense to arrow A. This rotation is imparted through the gear train to the flywheel. The velocity attained by the flywheel is mainly dependent on the flywheel inertia, gear ratio, mass of the sector and on the magnitude and duration of the acceleration applied. When the acceleration is removed, the sector no longer experiences inertial force, but the flywheel continues to rotate. If then a deceleration is applied to the device, the sector experiences inertial force tending to slow down or stop the rotation of the flywheel. It can be shown that the total angle of rotation is approximately proportional to the distance moved by the device (or a vehicle in which the device is mounted).

However, the velocity attained by the flywheel is also dependent on other factors, for instance bearing and gear friction, and these factors may change during the life of the device, so affecting its accuracy. According to one aspect this invention is concerned with detecting such alternations.

The invention provides a device sensitive to distance moved by the device, operating on the above-set-forth principle, and incorporated testing means comprising means enabling a standard energy impulse to be applied to drive the flywheel and sector, and means for enabling the actual response of the flywheel to said standard energy impulse to be measured so that said actual response may be compared with a standard response.

Said means for enabling the actual response to be measured may comprise limit switch means set to be actuated by a particular angular movement of said sector, and may also include zero switch means set to be actuated when the angular movement commences. The testing means are intended for use in combination with separate testing equipment for supplying said standard energy impulse, for measuring said response and for comparing said response with a standard. Preferably the testing equipment includes means for applying a reversed energy impulse so that the flywheel and sector are returned to their initial position after being tested.

The parameters liable to change are of kinds which will affect the response of the device to said standard energy impulse, so that it may be assumed that if the response has not altered more than a tolerated amount, then the response to actual bodily acceleration will also not have altered to an unacceptable degree and the device is still serviceable. It is therefore believed that the testing procedure the subject of the invention is an adequate substitute for the inconvenience of testing by subjecting to actual acceleration forces.

A specific form of the invention is illustrated in FIGURES 2–10 of the accompanying drawings, in which.

Figure 1:
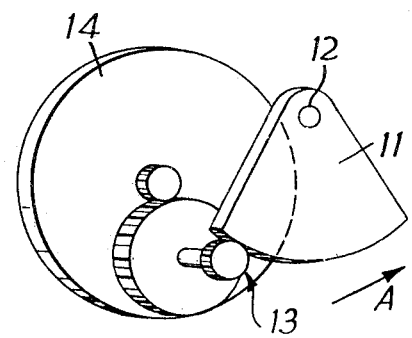

The distance sensitive device comprises a main body 16 and a stainless-steel switch compartment 17 which also forms a cover for the main body. The main body, as seen best in FIGURES 2 and 3 supports a geared sector 18 (which performs the function of the geared sector 11 described above) pivoted about axis 19 in nonlubricated, low friction bearings. The sector carries a tab 20 projecting from the main body into the switch compartment for actuating switches related to the angle through which the sector has turned.

Figure 2:
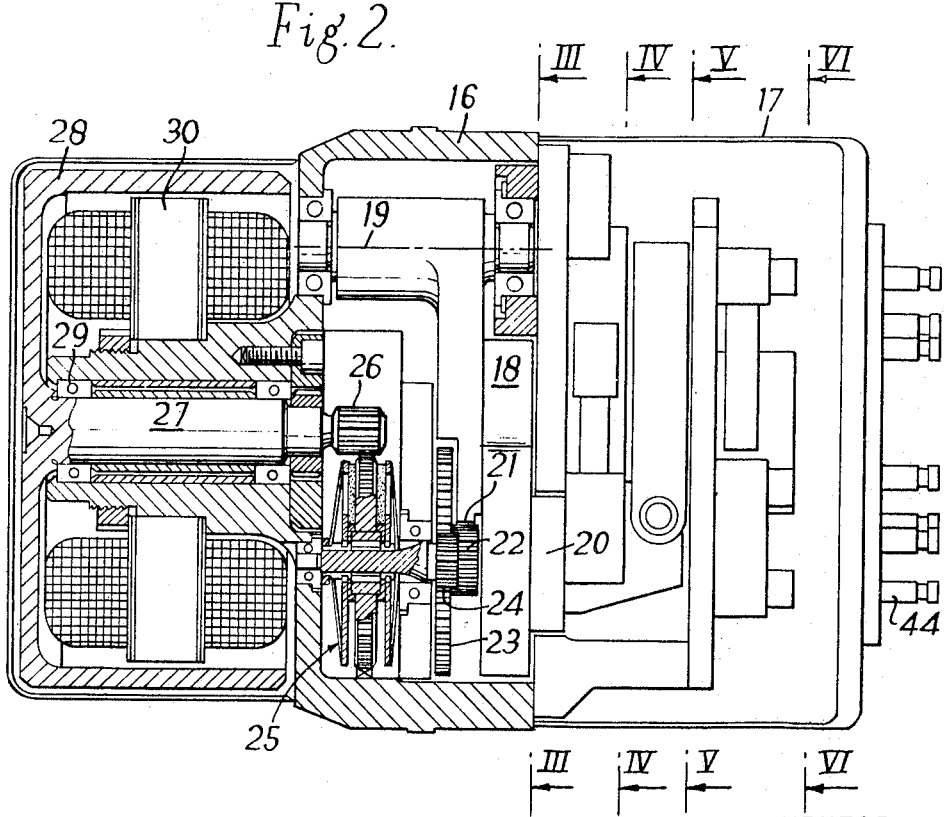
FIGURE 2 is a side section through the assembled device.

A curved, toothed side 21 of gear sector 18 engages a pinion 22 of a gear train including gear 23, pinion 24, clutch 25 and pinion 26 (FIGURE 2).

Pinion 26 is formed integrally with an inner spigot 27 of a cup-shaped flywheel 28, the pinion and flywheel being mounted for rotation on unlubricated preloaded bearings 29. The flywheel 28 has a dual purpose, carrying out both the function of the flywheel 14 discussed above, and also comprising the rotor of a hysteresis motor for use in testing the device. The stator 30 of the hysteresis motor surrounds the spigot 27 and has electrical leads (not shown) through which energising pulses may be fed to the stator windings.

Figure 3:
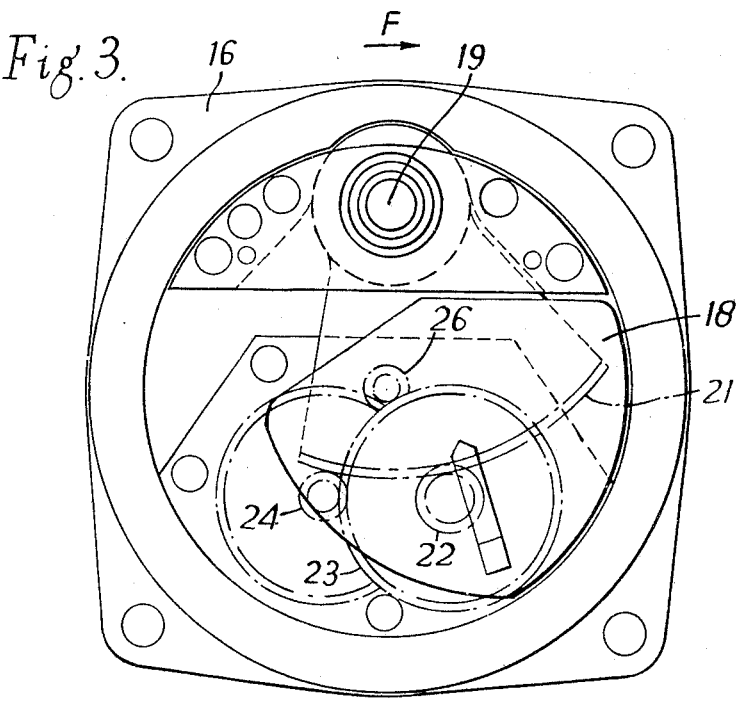
FIGURE 3 is a section on the line III—III of FIGURE 2.

In use, the device is mounted so that it is subjected to acceleration in the direction of arrow F in FIGURE 3. As discussed above, such acceleration causes rotary motion to be transferred from sector 18 through the gear train and clutch 25 to flywheel 28. Stops (described hereinafter) limit the rotation of the secor 18, but to avoid undue shock to the flywheel bearings and the gear teeth, the clutch 25, which incorporates a pair of spring-loaded friction discs, allows the flywheel to continue rotation when the sector 18 is so stopped.

The tab 20 which projects into the switch compartment, can actuate two distinct sets of switches, one set being testing switches and the other set being distance-indicating switches.

Figure 4:
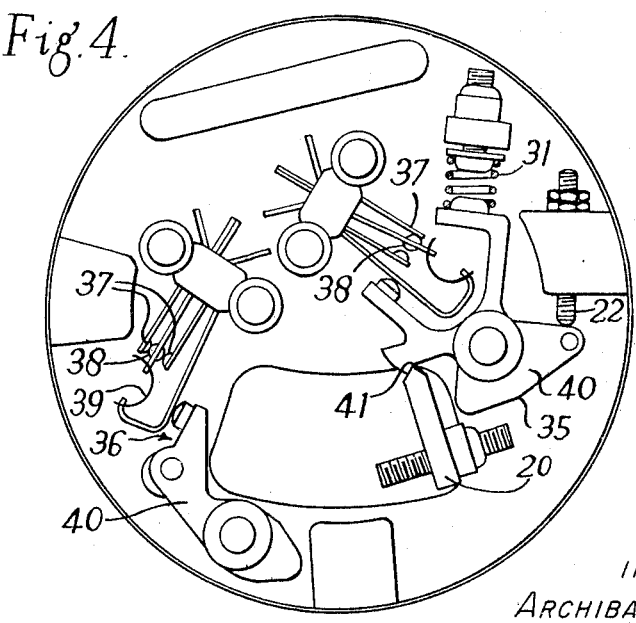
FIGURE 4 is a section through a switch compartment taken on the line IV—IV of FIGURE 2.

The testing switches are shown in FIGURE 4 and comprise a zero switch 35 and a limit switch 36. The two switches also act as the stops limiting the available movement of the sector as mentioned hereinbefore. Each switch comprises a pair of stationary contacts 37 and a movable contact 38 sandwiched therebetween mounted on leaf springs 39. Each switch also has a pivoted lever 40, a projection on which contacts the leaf springs. When the sector 18 has moved through a certain angle corresponding to a predetermined distance covered, a projection on the tab 20 contacts the lever 40 of the limit switch 36 and moves the movable contact 38 from engagement with one of the stationary contacts to engage the other.

Prior to movement of the sector the tab 20 is held in the zero position shown in FIGURE 4. Lever 40 of the zero switch has a shallow notch 41 in which the tab 20 engages to be locked in the zero position. In this position lever 40 engages adjustable backstop 22 and is urged by adjustable spring 31 to hold tab 20 engaged. Spring 31 is adjusted to a pressure such that the device must undergo an acceleration of $3g$ before the force on tab 20 due to sector 18 is sufficient to overcome the spring 31 and to release the tab 20 from notch 41.

Although test switches 35 and 36 are operated both in periodic testing and in actual use of the device, their function (apart from the $3g$ stop described above) is only for testing, as also is the function of the motor. Parameters which can disturb the calibration of the device include consistency of bearing and gear friction and switch operating characteristics, and it is alterations in these parameters which must be detected in periodic testing procedures. Once the device is calibrated, it is not thought necessary or practical to test the device in the most obvious way, i.e. by moving it through a measured distance and comparing the angular movement with the measured distance. The simple static testing procedure adopted comprises energising the motor with a precisely determined standard electrical pulse, and measuring the time taken between the consequent opening of the zero testing switch 35 and the closing of the limit switch 36. The adjustment of the limit switch position is such that in correct operation the said time is a standard time for a standard input pulse. As the final part of the testing procedure, the motor must be reversed and the 20 reset to the zero position.

To carry out the static test, testing equipment is connected which comprises a single unit powered from a three phase electrical supply, containing manually-controlled means for adjusting the voltage on each phase so as to set the standard input pulse, a digital counter for measuring the time interval between the operation of the testing switches, and means for reversing the motor so as to reset the tab 20 to zero. The unit is programmed so that following adjustment of the voltages, the pressing of a button initiates the whole cycle.

Figure 5:
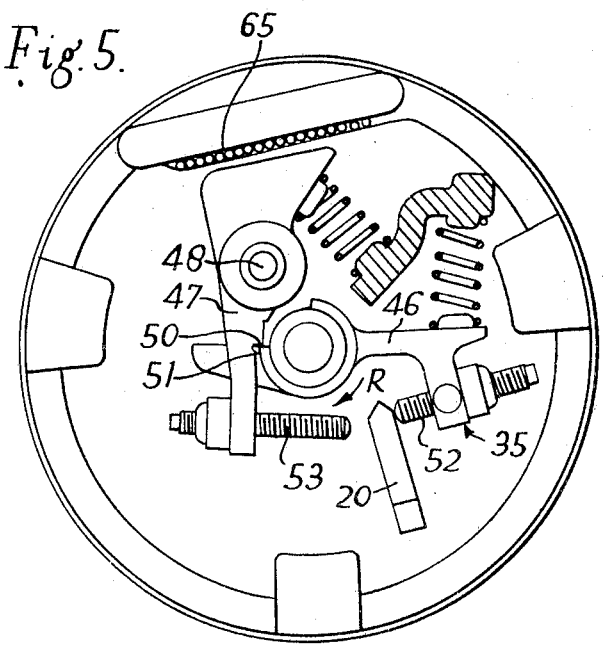
FIGURE 5 is a section on the line V—V of FIGURE 2.
Figure 6:
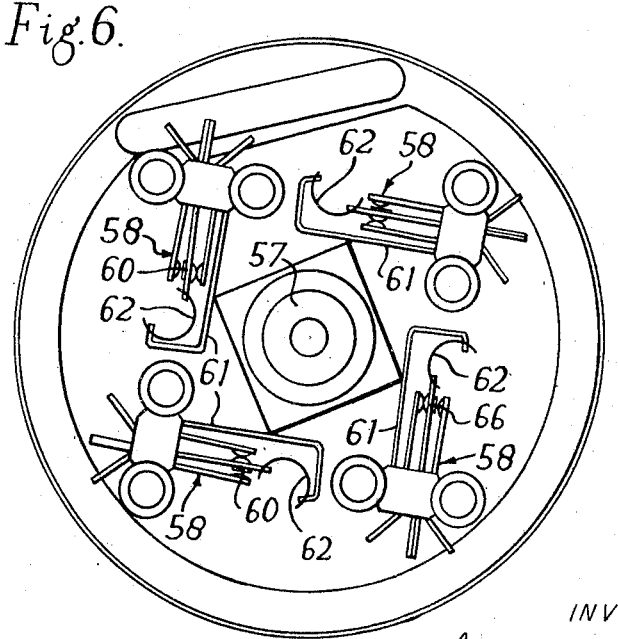
FIGURE 6 is a section on the line VI—VI of FIGURE 2.

The distance indicating switches shown in FIGURE 6 are actuated by an arrangement shown in FIGURE 5. The actuating member 46 is spring-loaded to tend to turn clockwise (as viewed in FIGURE 5 and indicated by arrow R). When the device is at rest, the actuating member is prevented from so turning by trigger 47, which is pivoted about point 48, and is spring-loaded so that one end is urged towards the actuating member and a shoulder 50 on the trigger engages in a notch 51 on the actuating member. The trigger is mass-balanced to raise the shock and vibration resistance levels. Actuating member 46 is also partially mass-balanced.

An arm of the actuating member carries an adjustable stop 52 against which the tab 20 rests when in the zero position shown in FIGURE 5. When the device is accelerated by more than $3g$, the tab 20 is moved until after a predetermined distance has been covered it engages adjustable stop 53 on the end of the trigger. The trigger 47 is therefore pushed away from the actuating member, and shoulder 50 is released from the notch 51. This releases the actuating member 46 for rotation under the influence of its spring. The energy supplied by this spring is many times greater than that obtained from the flywheel, and is used for operating the distance indicating switches. The integrating mechanism is not therefore required to supply all the energy for operating the switches and accordingly is smaller than otherwise would be required, with a corresponding increase in accuracy.

Mounted for rotation with the actuating member 46, is cam 57 (seen in FIGURE 6). Arranged equispaced about cam 57 are four similar change-over switches 58. Each switch has a pair of stationary contacts and a single contact 60 carried on spring arms 61, 62 and movable to contact one or other of the stationary contacts. When the cam 57 is rotated by the actuating member, each of is four cam faces engages the spring arm 61 of a respective one of the switches 58, and changes over the contacts.

The four switches 58 may be connected, for instance in series, to operate other apparatus after the predetermined distance has been covered, or could be arranged to give a visual indication when the predetermined distance is reached. In an alternative arrangement (not shown) the distance indicating switches are omitted, the output from the device being in the form of a mechanical motion (i.e. a reciprocation or rotation of an output shaft).

For use, the switch compartment is sealed to the main body by projection welding, the interior is evacuated and filled first with radio active Krypton gas to test for leakages and then with sulphur hexafluoride gas. This lastmentioned gas has high dielectric and arc quenching properties and so increases the switching capacity. Before the switch compartment is attached to the main body, however, the device must be calibrated and the various adjustable stops correctly positioned. In order for this to be done, the connection wires from the motor, the testing switches 35 and 36 and the distance indicating switches 58 are encapsulated side-by-side in a cable harness 65 (FIG. 5) joining the switch compartment and the main body at a hinge point. The assembled parts can then be pivoted apart for access to the interior. The connection wires terminate in external pins 44 (FIG. 2). In another arrangement the connection wires are formed by printed circuit methods of film wiring.

The device described is capable of reasonably accurate operation over a wide acceleration range and severe shock, vibration and temperature conditions, e.g. with a tolerance of $\pm 20$ percent over ranges between 2,500 and 10,000 ft. with axial accelerations ranging from $5g$ for 15 seconds to $50g$ for 1½ seconds.

In order that the accuracy be maintained over a wide temperature range, e.g., from $-40°$ C. to $+150°$ C., non-lubricated bearings are used, as the usual lubricating materials are liable to change their characteristics over a period of time when subject to these temperature changes. For avoiding a false rotation of the flywheel which could be set up under certain adverse vibration conditions, the flywheel bearings are pre-loaded. The compactness of the design enables the device to be of a small size, for instance about 3½ inches by 2¼ inches diameter.

One specific use for which the distance indicating device is intended, is for mounting in a guided missile for sensing when the missile has flown a predetermined distance from the launching point, and for then completing part of an electrical circuit allowing the missile to be armed. It will be noted that only the periodic testing procedure which is carried out on the ground requires a power supply, the device in use being powered entirely by inertia and spring forces. For ground testing, all that needs to be done is to make electrical connections to those of terminals 44 which lead to the motor and the testing switches 35 and 36. As explained above, the standard pulse is applied to the motor and the time between opening of switch 35 and closing of switch 36 compared with a standard time. Variation in this time beyond an allowed tolerance indicates that one or more of the parameters affecting accuracy has altered, and so that the device would not operate accurately in flight. The means for producing the standard pulse and for effecting the time comparison are incorporated into a single ground testing unit, which is not mounted in the missile.

What is claimed is:

1. A distance-moved sensitive device having mechanical double-integrating means comprising a pivoted sector, a gear train meshing with said sector, and a flywheel drivingly connected to the gear train; a testing electrical motor connected to drive said double-integrating means, tested electrical switch means adjacent the path of said sector, output electrical switch means adjacent said testing switch means, and a switch-actuating member mounted on said sector to actuate both the testing switch means and the output switch means when the sector has rotated through a predetermined angle.

2. A device as claimed in claim 1, wherein the output switch means comprises a plurality of separate switches, cam means rotatable to actuate all the separate switches, a compression spring acting on said cam means in the sense to actuate the switches, and a locking device holding the cam means against rotation, said switch-actuating member mounted on the sector being positioned to release said locking device when the sector has rotated through a predetermined angle.

3. A distance-moved sensitive device having mechanical double integrating means comprising a pivoted sector, a gear train meshing with said pivoted sector, and a flywheel drivably connected to said gear train; electric motor testing means having a rotor which is also the flywheel of said double integrating means, said electric motor testing means connected to drive said double integrating means, and position sensing means cooperating with said double-integrating means to detect rotational movement thereof.

References Cited

UNITED STATES PATENTS

| | | | |
|---|---|---|---|
| 2,949,026 | 8/1960 | Gindes et al. | |
| 3,157,757 | 11/1964 | Lorenz | 200—61.45 |
| 3,275,767 | 9/1966 | Bergey | 200—61.45 |

S. CLEMENT SWISHER, Primary Examiner

U.S. Cl. X.R.

200—6145; 33—490